US012606714B2

(12) United States Patent
Wei et al.

(10) Patent No.: US 12,606,714 B2
(45) Date of Patent: Apr. 21, 2026

(54) SELF-DIAGNOSIS AND SELF-REPAIR INTELLIGENT COATING BASED ON MICROFLUIDIC TECHNOLOGY AND PREPARATION METHOD THEREOF

(71) Applicant: CHINA JILIANG UNIVERSITY, Hangzhou City (CN)

(72) Inventors: Guoying Wei, Hangzhou City (CN); Jing Hu, Hangzhou City (CN); Cuiping Ji, Hangzhou City (CN); Qingqing Tang, Hangzhou City (CN); Li Ren, Hangzhou City (CN); Feifan Chang, Hangzhou City (CN); Benfeng Zhu, Hangzhou City (CN)

(73) Assignee: CHINA JILIANG UNIVERSITY, Hangzhou City (CN)

( * ) Notice: Subject to any disclaimer, the term of this patent is extended or adjusted under 35 U.S.C. 154(b) by 41 days.

(21) Appl. No.: 19/243,216

(22) Filed: Jun. 19, 2025

(65) Prior Publication Data

US 2026/0008927 A1     Jan. 8, 2026

(30) Foreign Application Priority Data

Jul. 8, 2024     (CN) .......................... 202410903615.9

(51) Int. Cl.
| | |
|---|---|
| *C09D 7/40* | (2018.01) |
| *B01J 13/16* | (2006.01) |
| *C09D 7/63* | (2018.01) |
| *C09D 7/65* | (2018.01) |
| *C09D 183/04* | (2006.01) |

(52) U.S. Cl.
CPC ................ *C09D 7/70* (2018.01); *B01J 13/16* (2013.01); *C09D 7/63* (2018.01); *C09D 7/65* (2018.01); *C09D 183/04* (2013.01)

(58) Field of Classification Search
CPC ... C09D 7/63; C09D 7/65; C09D 7/70; C09D 183/04; B01J 13/16
See application file for complete search history.

(56) References Cited

FOREIGN PATENT DOCUMENTS

| | | |
|---|---|---|
| CN | 102702838 A | 10/2012 |
| CN | 106220014 A | 12/2016 |
| CN | 108671970 A | 10/2018 |
| CN | 109201130 A | 1/2019 |
| CN | 115679708 A * | 2/2023 |

(Continued)

OTHER PUBLICATIONS

Machine-generated English-language translation of CN-115679708-A.*

(Continued)

*Primary Examiner* — Vu A Nguyen
(74) *Attorney, Agent, or Firm* — Tarolli, Sundheim, Covell & Tummino LLP

(57) ABSTRACT

A self-diagnosis and self-repair intelligent coating based on microfluidic technology and a preparation method thereof are provided. Microcapsules are prepared by combining microfluidic T-junction and interfacial polymerization. The wall material of the microcapsules is made of polyurea, and the core material is made of diagnostic agent, repair agent and photoinitiator. Self-diagnosis and self-repair microcapsules are evenly distributed in the coating with silicone resin as matrix.

7 Claims, 25 Drawing Sheets

(56)            References Cited

FOREIGN PATENT DOCUMENTS

| | | | |
|---|---|---|---|
| CN | 115897251 | A | 4/2023 |
| KR | 101168038 | B1 | 7/2012 |
| KR | 101810083 | B1 | 12/2017 |

OTHER PUBLICATIONS

Notice of first Office action dated Aug. 16, 2024 in SIPO application No. 2024109036159.
Retrieval report-First search dated Aug. 14, 2024 in SIPO application No. 2024109036159.
Notification to Grant Patent Right for Invention dated Sep. 11, 2024 in SIPO application No. 2024109036159.
Retrieval report-Supplementary search dated Sep. 3, 2024 in SIPO application No. 2024109036159.
Hu Jing et al. Research Progress on External Self-healing Coating Based on Microcapsule Technology, Paint & Coatings Industry, Apr. 22, 2024, p. 2, Part of the preparation method of microcapsules Claims involved: 1-3.

\* cited by examiner

SELF-DIAGNOSIS AND SELF-REPAIR INTELLIGENT COATING BASED ON MICROFLUIDIC TECHNOLOGY AND PREPARATION METHOD THEREOF

CROSS-REFERENCE TO RELATED APPLICATIONS

This application claims priority to Chinese Patent Application No. 202410903615.9, filed on Jul. 8, 2024, the contents of which are hereby incorporated by reference.

TECHNICAL FIELD

The disclosure belongs to the technical field of coatings, in particular to a self-diagnosis and self-repair intelligent coating based on microfluidic technology and a preparation method thereof.

BACKGROUND

As a vital functional material and protective technology, polymer coating is widely used on the surface of important parts to improve its protective performance and prolong the service life of the matrix. However, in the process of application, the coating is inevitably affected by various environmental factors, resulting in microcracks. The formation and propagation of microcracks will lead to a sharp decline in the mechanical stability of the coating, which will lead to a decline in the performance of the coating and eventually cause permanent damage to the matrix material. If microcracks are detected in time at the initial stage of formation, corresponding measures may be taken to protect the matrix from damage.

Although the self-diagnosis coating may indicate the defects of the coating, it may not automatically repair the nano-micron defects. Replacing the ineffective coating will waste manpower and material resources. The development cost and time cost of developing resin matrix with higher performance will increase greatly. Therefore, it is of great research significance to give the coating a self-diagnosis way, self-indicate the initial microcracks in time, and give the coating self-healing behavior to prolong the performance cycle and service life of the coating.

In order to protect diagnostic agents and repair agents, microcapsules are used to encapsulate fluorescent molecules and repair molecules in the prior art to prevent the molecules from reacting with active groups in the coating in advance or being degraded by ultraviolet light, thus affecting self-diagnosis and self-repair performance. The self-repair coating with external aid based on microcapsules has the greatest advantages: isotropic spherical microcapsules have good dispersibility in resin matrix; there are various choices of wall materials and core materials; and there are abundant preparation methods. When the coating produces microcracks, the microcapsules embedded in the resin matrix rupture and the repair agent flows out of the microcrack-filled area, thus repairing the cracks.

In a large number of studies, although the preparation methods of microcapsules (such as in-situ polymerization, interfacial polymerization, emulsion polymerization, etc.) may obtain better microcapsules to a certain extent, the microcapsules are easy to reunite, the preparation process is more complicated, and the distribution is uneven. The precise flow control provided by microfluidic technology provides a potential means to overcome these limitations. The preparation of monodisperse emulsion and monodisperse microcapsule by microfluidic technology may realize the repeatability and controllability of microcapsule with uniform particle size. At present, there is no report on the preparation of self-diagnosis and self-repair intelligent coatings based on microfluidic technology for microcapsules coated with diagnostic agents and repair agents at the same time.

SUMMARY

In order to solve the above technical problems, the disclosure provides a self-diagnosis and self-repair intelligent coating based on microfluidic technology and a preparation method thereof. The intelligent coating is prepared by blending the microcapsules coated with diagnostic agent and repair agent with silicone resin matrix. In the service engineering, the generation of microcracks is observed by fluorescence microscope and the ultraviolet-induced microcracks are repaired in time.

To achieve the above objectives, the present disclosure provides following technical scheme.

A self-diagnosis and self-repair intelligent coating based on microfluidic technology, where raw materials include microcapsules and resin matrix;

the microcapsules consist of a shell material and coating materials;

the shell material is polyurea;

the coating materials are a repair agent, a diagnostic agent (fluorescent molecule) and a photoinitiator;

the repair agent is 1,3-bis(3-glycidyl propyl)-1,1,3,3-tetramethyldisiloxane;

the diagnostic agent (fluorescent molecule) is rhodamine B; and the photoinitiator is triarylsulfonium hexafluorophosphate.

The term "coating material" in the present disclosure refers to the core material of microcapsules.

In an embodiment, the resin matrix is a mixture of self-drying silicone resin and silane coupling agent with a mass ratio of 20:1; and mass content of the microcapsules in the raw materials is 11.1-14.3%, preferably 11.1%, 12.5% and 14.3%.

The disclosure also provides a preparation method of the self-diagnosis and self-repair intelligent coating based on the microfluidic technology includes following steps:

using the microfluidic technology, pumping dispersed phase solution and continuous phase solution into Polytetrafluoroethylene (PTFE) tube 1 and PTFE tube 2 in a microfluidic chip respectively; in a chip, the continuous phase solution cuts the dispersed phase solution into uniform droplets, and the droplets are introduced into reaction solution with continuous mechanical stirring to form a polyurea film; after the chip cutting the droplets are finished, placing the reaction solution in a water bath pot and continuously heating and stirring, so that the polyurea film grows thicker and becomes polyurea-based microcapsules; and the obtained polyurea-based microcapsules are washed with cyclohexane, sonicated, centrifuged, and then naturally dried to obtain the microcapsules;

mixing the microcapsules with the resin matrix to obtain a self-diagnosis and self-repair intelligent coating material based on the microfluidic technology; and coating the self-diagnosis and self-repair intelligent coating material based on the microfluidic technology on a glass slide and curing to obtain the self-diagnosis and self-repair intelligent coating based on the microfluidic technology;

a preparation method of the dispersed phase solution is ultrasonically mixing the 1,3-bis (3-glycidyl propyl)-1,1,3,3-tetramethyldisiloxane, the triarylsulfonium hexafluorophosphate, the rhodamine B and tetraethylenepentamine;

a preparation method of the continuous phase solution is ultrasonically mixing n-hexadecane solution and polyethylene glycol dimeric hydroxy stearate; and a preparation method of the reaction solution is ultrasonically mixing 4,4-dicyclohexylmethane diisocyanate, decalin, the polyethylene glycol dimeric hydroxy stearate and triethylenediamine.

In an embodiment, a flow rate of the dispersed phase solution is 0.02 milliliters per minute (mL/min), and a flow rate of the continuous phase solution is 0.4-0.6 mL/min.

In an embodiment, a speed of the mechanical stirring is 100 revolutions per minute (rpm); parameters of the heating and stirring are as follows: a temperature is 40-60 degrees Celsius (C), time is 1-2 hours (h), and a stirring speed is 200 rpm.

In an embodiment, in the microfluidic chip, the PTFE tube 1 is inserted into the PTFE tube 2 and is 30 millimeters (mm) away from the outlet end of the PTFE tube 2.

In an embodiment, the PTFE tube 1 has an inner diameter of 0.46 mm and an outer diameter of 0.76 mm, and is connected with a syringe filled with dispersed phase solution.

The PTFE tube 2 has an inner diameter of 0.96 mm and an outer diameter of 1.26 mm, and its inlet end is connected with a syringe filled with continuous phase solution, and its outlet end is connected with the reaction solution.

Compared with the prior art, the disclosure has following advantages and technical effects.

The intelligent coating of the present disclosure is functionally diversified by adding microcapsules with self-detection and self-repair functional molecules, which may provide the coating with self-repair and self-detection function. When microcracks appear, which leads to the rupture of microcapsules, the diagnostic agent healing agent in microcapsules flows out and fills the microcrack area. At this time, the fluorescence reaction may be observed and the generation of microcracks may be monitored. When the coating is irradiated under ultraviolet light, the microcracks heal themselves due to the curing of the healing agent.

Core-shell microcapsules prepared by microfluidic technology and interfacial polymerization have smooth surface and small size (~0.95 micrometers ($\mu$m)), which is much smaller than that prepared by conventional microfluidic technology and more uniform than that prepared by interfacial polymerization.

Based on the microfluidic technology and the interfacial polymerization method, the microcapsules coated with diagnostic agent and repair agent at the same time may be prepared, and the size structure of microcapsules and the coating rate of repair agent in microcapsules may be controlled by adjusting the content of each component of dispersed phase and the flow rates of dispersed phase and continuous phase. The obtained microcapsules have smooth surface morphology and core-shell structure, and have good sphericity and high monodispersity.

The efficient method of preparing small-sized core-shell microcapsules based on microfluidic technology and interfacial polymerization has a good application prospect in the field of coatings. In addition, the monitoring and self-healing at the initial stage of coating microcrack formation realized by the disclosure has practical application prospect in special environment.

BRIEF DESCRIPTION OF THE DRAWINGS

The attached drawings, which constitute a part of this disclosure, are used to provide a further understanding of this disclosure. The illustrative embodiments and descriptions of this disclosure are used to explain this disclosure, and do not constitute an improper limitation of this disclosure. In the attached drawings.

DETAILED DESCRIPTION OF THE EMBODIMENTS

Figure 1:
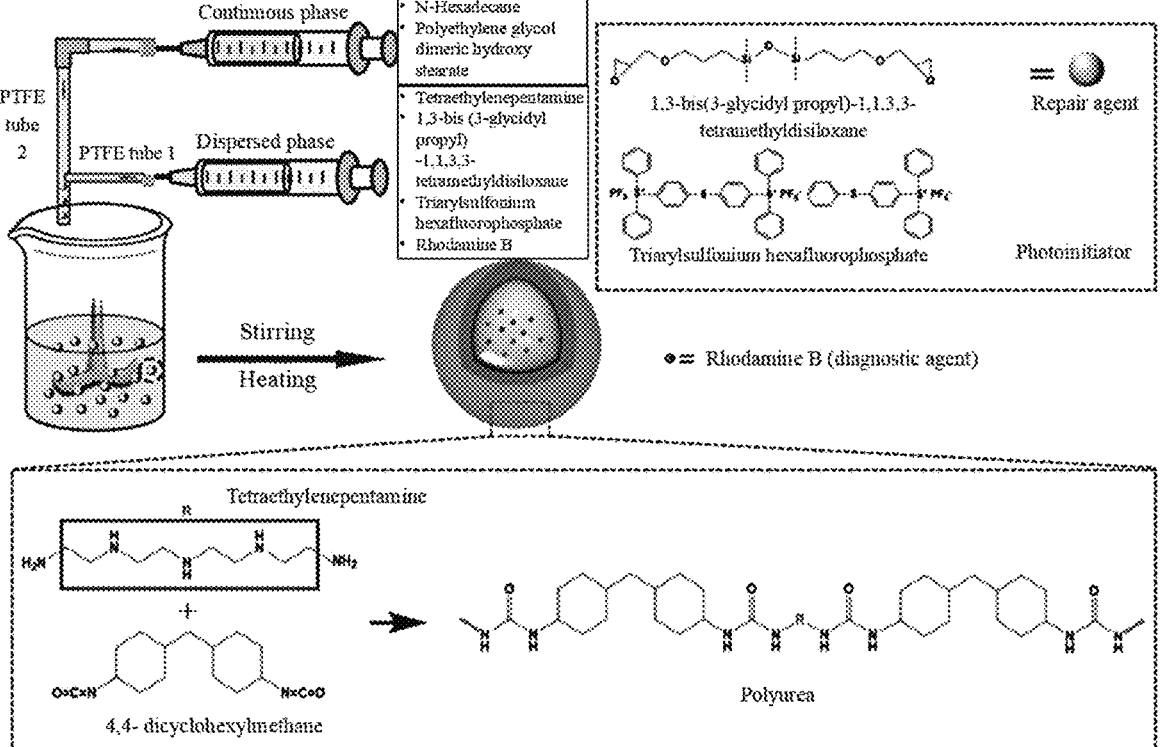
FIG. 1 is a schematic flow diagram of the preparation method of the present disclosure.

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology used in the present disclosure is only for describing specific embodiments and is not used for limiting the present disclosure. In addition, for the numerical range in the present disclosure, it should be understood that each intermediate value between the upper limit and the lower limit of the range is also specifically disclosed. The intermediate value within any stated value or stated range and each smaller range between any other stated value or intermediate value within the stated range are also included in the present disclosure. The upper and lower limits of these smaller ranges may be independently included or excluded from the range.

Unless otherwise specified, all technical and scientific terms used herein have the same meaning as commonly understood by one of ordinary skill in the art to which this disclosure relates. Although the present disclosure only describes the preferred methods and materials, any methods and materials similar or equivalent to those described herein may also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present specification without departing from the scope or spirit of the present disclosure. Other implementation modes obtained from the description of the present disclosure are obvious to the skilled person. The description and embodiments of the present disclosure are exemplary only.

The terms "including", "comprising", "having" and "containing" used herein are all open terms, which means including but not limited to.

The "room temperature" in the present disclosure refers to 20-30° C. unless otherwise specified.

The raw materials used in the disclosure are all purchased in the market.

Microfluidic technology refers to the technology of making microfluidic chips by using glass capillaries or PTFE (Polytetrafluoroethylene) tubes to handle or manipulate tiny fluids in microchannels. This technology accurately controls the flow and dispersion of multiphase fluid in micro-scale space, so as to realize the precise regulation of the size and morphology of composite emulsion particles and produce uniform droplets. A variety of immiscible fluids are sheared into single O/W(W/O) or double O/W/O(W/O/W) or even higher-order template droplets, and then solidified into microcapsules.

In this disclosure, microcapsules are prepared by combining microfluidic T-junction and interfacial polymerization. The wall material of the microcapsules is composed of polyurea, and the core material is composed of repair agent, diagnostic agent and photoinitiator. Self-diagnosis and self-repair microcapsules are evenly distributed in the coating based on silicone resin. The self-diagnosis and self-repair coating provided by the disclosure has the function of spontaneously detecting microcracks in the coating and prompting the generation of microcracks in a fluorescent way. At the same time, it has the function of ultraviolet-induced spontaneous repair of microcracks produced in the coating. The disclosure realizes the monitoring and self-healing of coating microcracks at the initial stage of formation, has important economic significance, and is expected to realize practical application in special environment.

The disclosure provides a self-diagnosis and self-repair intelligent coating based on microfluidic technology, including microcapsules and resin matrix;

where the microcapsules consist of a shell material and coating materials;

the shell material is polyurea, which is harmless, excellent in mechanical and chemical stability and high in cross-linking density;

the coating materials are a repair agent, a diagnostic agent and a photoinitiator;

the repair agent is 1,3-bis(3-glycidyl propyl)-1,1,3,3-tetramethyldisiloxane;

the diagnostic agent (fluorescent molecule) is rhodamine B; and the photoinitiator is triarylsulfonium hexafluorophosphate.

In this disclosure, 1,3-bis(3-glycidyl propyl)-1,1,3,3-tetramethyldisiloxane is selected as the repair agent, which is a specific functional group contained in the molecular structure, such as glycidyl propyl. When the coating is damaged and the capsule is broken, the repair agent is released from the microcapsule. At this time, glycidyl propyl forms a new chemical bond or cross-linking point under the action of photoinitiator and cures, thus filling the damaged area and restoring the integrity of the coating. Fluorescent molecules play an indicating role. When the coating breaks, the fluorescent molecules indicate the cracks, and the repair agent repairs the cracks at the same time, thus playing a dual role of self-diagnosis and self-repair.

In the following preferred embodiment of the present disclosure, the resin matrix is a mixture of self-drying silicone resin and silane coupling agent with a mass ratio of 20:1. In the self-diagnosis and self-repair intelligent coating, the mass ratio of microcapsules to resin matrix is 1:(6-8), optionally 1:8, 1:7 and 1:6.

The preparation method of self-diagnosis and self-repair intelligent coating based on microfluidic technology includes the following steps.

1) A preparation method of the dispersed phase solution is ultrasonically mixing the 1,3-bis(3-glycidyl propyl)-1, 1,3,3-tetramethyldisiloxane, the triarylsulfonium hexafluorophosphate, the rhodamine B and tetraethylenepentamine.

2) A preparation method of the continuous phase solution is ultrasonically mixing n-hexadecane solution and polyethylene glycol dimeric hydroxy stearate (as long as the raw materials may be dissolved and dispersed, there is no special limitation, the same below).

3) A preparation method of the reaction solution is ultrasonically mixing 4,4-dicyclohexylmethane diisocyanate, decalin, the polyethylene glycol dimeric hydroxy stearate and triethylenediamine.

4) Using microfluidic technology, the dispersed phase solution and the continuous phase solution are pumped into PTFE tube 1 and PTFE tube 2 in the microfluidic chip by injection pumps with different flow rates. In the chip, the dispersed phase solution is cut into uniform droplets by the continuous phase solution, and the droplets are introduced into the continuous mechanical stirring reaction solution. Using the reaction between polyamine in PTFE tube 1 and isocyanate in the reaction solution, the interface immediately polymerizes to form a polyurea film, which encapsulates the repair agent, diagnostic agent and photoinitiator. After the chip shearing drops are finished, the reaction solution is placed in a water bath pot and continuously heated and stirred, so that the polyurea film grows thicker and becomes polyurea-based microcapsules; and washing the obtained polyurea-based microcapsules with cyclohexane, ultrasonicating for 20-30 minutes (min), centrifuging at 6000 rpm for 5 min, and naturally drying to obtain microcapsules; and according to the disclosure, the microcapsules in the embodiment are tested by thermogravimetry, and the microcapsules with the best coating rate of the repair agent are analyzed, and the steps 5) and 6) are carried out, and the performance of the microcapsules is tested.

5) Mixing the microcapsules with a resin matrix (which is made by mixing self-drying silicone resin and silane coupling agent according to the mass ratio of 20:1) according to the mass ratios of 1:8, 1:7 and 1:6, respectively, to obtain the self-diagnosis and self-repair intelligent coating based on microfluidic technology.

6) Coating the self-diagnosis and self-repair intelligent coating material based on microfluidic technology on a glass slide, and curing at 75° C. for more than 24 h to obtain the self-diagnosis and self-repair intelligent coating based on microfluidic technology.

In the following preferred Embodiment 1) of the present disclosure, the mass ratio of the 1,3-bis(3-glycidyl propyl)-1,1,3,3-tetramethyldisiloxane, triarylsulfonium hexafluorophosphate, rhodamine B and tetraethylenepentamine is optionally 1.1:0.09:0.09:1.

In the following preferred Embodiment 2) of the present disclosure, the mass ratio of the n-hexadecane solution to the polyethylene glycol dimeric hydroxy stearate is 2.784:0.027.

In the following preferred Embodiment 3) of the present disclosure, the mass ratio of the 4,4-dicyclohexylmethane diisocyanate, decalin, polyethylene glycol dimeric hydroxy stearate and triethylenediamine is 9:67.2:0.75:0.75.

In the following preferred Embodiment 4) of the present disclosure, the flow rate of the dispersed phase solution is 0.02 mL/min, and the flow rate of the continuous phase solution is 0.4-0.6 mL/min, optionally 0.4 mL/min, 0.5 mL/min or 0.6 ml/min, and more optionally 0.5 mL/min.

Before the chip shearing droplet ends, the speed of the mechanical stirring is 100 rpm. The parameters of heating and stirring are: temperature 40-60° C., time 1-2 h, and stirring rate 200 rpm. The specific heating is: heating and stirring at 40° C. for 1 h, then heating and stirring at 50° C. for 2 h, and finally heating and stirring at 60° C. for 2 h, during which the stirring rate is 200 rpm.

In the microfluidic chip, a PTFE tube 1 is inserted into a PTFE tube 2, and the distance is 30 mm from the outlet end of the PTFE tube 2. The PTFE tube 1 has an inner diameter of 0.46 mm and an outer diameter of 0.76 mm, and is connected with a syringe filled with dispersed phase solution. The PTFE tube 2 has an inner diameter of 0.96 mm and an outer diameter of 1.26 mm, its inlet end is connected with an syringe filled with continuous phase solution, and its outlet end is connected with the reaction solution.

The technical scheme of the present disclosure will be further explained by embodiments.

FIG. 1 is a schematic diagram of the preparation method of the present disclosure.

Embodiment 1

The preparation method of self-diagnosis and self-repair intelligent coating based on microfluidic technology includes the following steps.

1) Preparation of dispersed phase solution: 1.1 g of 1,3-bis(3-glycidyl propyl)-1,1,3,3-tetramethyldisiloxane, 0.09 grams (g) of triarylsulfonium hexafluorophosphate, 0.09 g of rhodamine B and 1 g of tetraethylenepentamine are mixed by ultrasonic.

2) Preparation of continuous phase solution: 13.92 g of n-hexadecane solution and 0.135 g of polyethylene glycol dimeric hydroxy stearate are ultrasonically mixed.

3) Preparation of reaction solution: 9 g of 4,4-dicyclohexylmethane diisocyanate, 67.2 g of decalin, 0.75 g of polyethylene glycol dimeric hydroxy stearate and 0.75 g of triethylenediamine are ultrasonically mixed.

4) Using microfluidic technology, the flow rates of dispersed phase solution and continuous phase solution are adjusted to 0.02 mL/min and 0.5 mL/min, respectively, and are pumped into PTFE tube 1 and PTFE tube 2 in microfluidic chip by injection pump. In the chip, the dispersed phase solution is cut into uniform droplets by the continuous phase solution, and the droplets are introduced into the reaction solution which is continuously mechanically stirred at 100 rpm. Using tetraethylenepentamine in PTFE tube 1 to react with isocyanate in the reaction solution, the interface immediately polymerizes to form a polyurea film, which wraps the repair agent, diagnostic agent and photoinitiator. After the chip shearing droplets is finished, the reaction solution is placed in a water bath pot to react at 40° C. for 1 h, at 50° C. for 2 h, and at 60° C. for 2 h, and the rotation speed is kept at 200 rpm, so that the polyurea film grows thicker and becomes polyurea-based microcapsules. The obtained polyurea-based microcapsules are washed with cyclohexane, ultrasonicated for 25 min, centrifuged at 6000 rpm for 5 min, and then naturally dried to obtain microcapsules.

5) Mixing the microcapsule with a resin matrix (which is formed by mixing self-drying silicone resin and silane coupling agent according to a mass ratio of 20:1) according to a mass ratio of 1:7 to obtain a self-diagnosis and self-repair intelligent coating based on microfluidic technology.

6) The self-diagnosis and self-repair intelligent coating material based on microfluidic technology is coated on a glass slide and cured at 75° C. for more than 24 h, thus obtaining the self-diagnosis and self-repair intelligent coating based on microfluidic technology (named MC-12.5).

Figure 2:
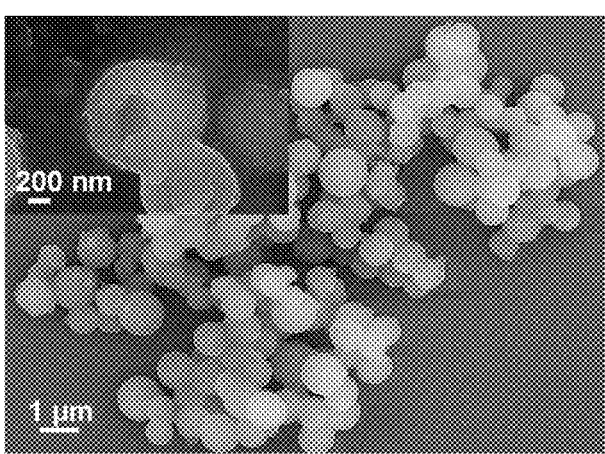
FIG. 2 is a scanning electron microscope image of microcapsules prepared in Embodiment 1.
Figure 3A:
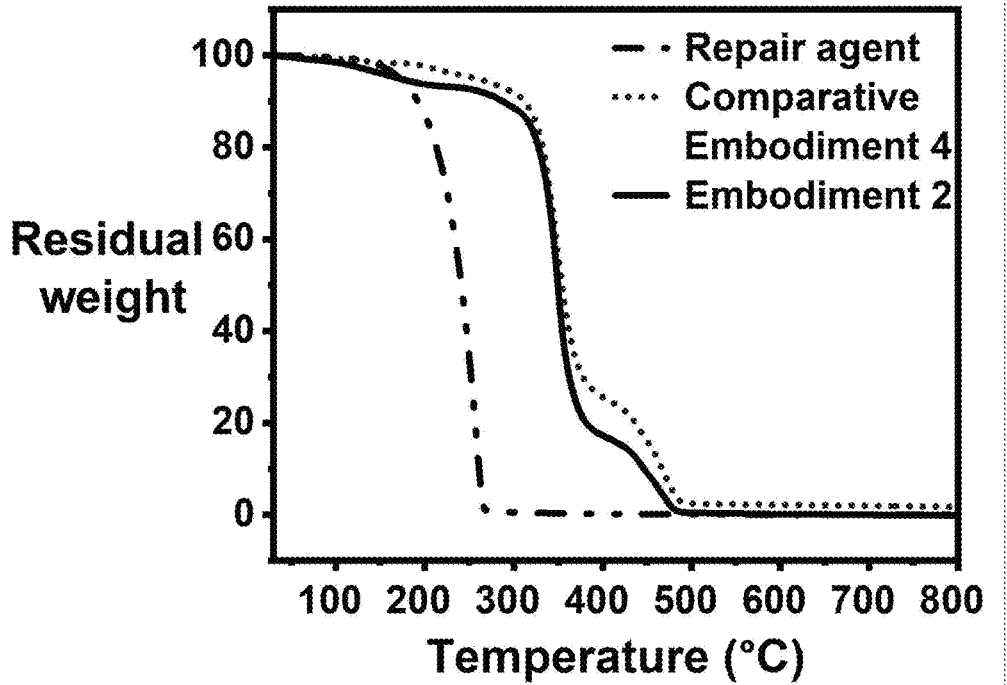
FIG. 3A is a thermogram of microcapsules prepared in Embodiment 2.
Figure 3B:
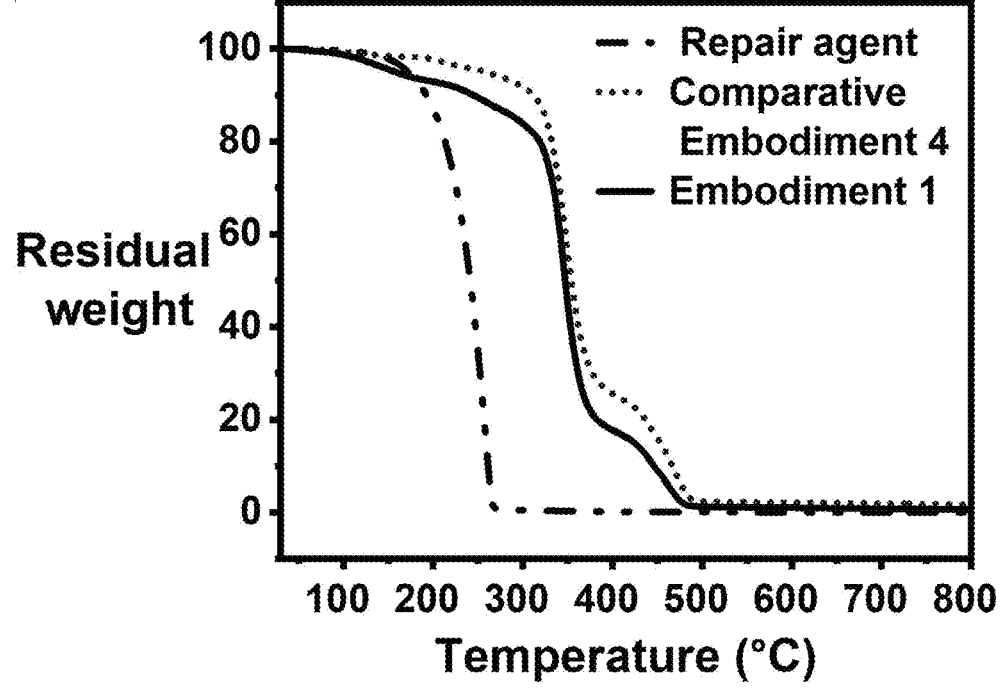
FIG. 3B is a thermogram of microcapsules prepared in Embodiment 1.
Figure 3C:
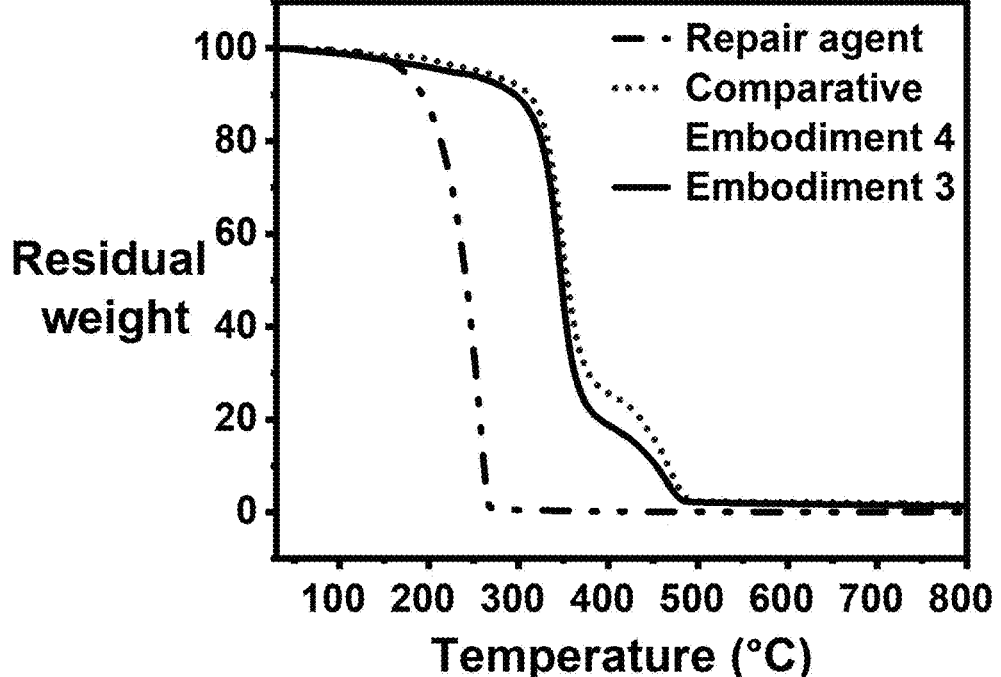
FIG. 3C is a thermogram of microcapsules prepared in Embodiment 3.
Figure 3D:
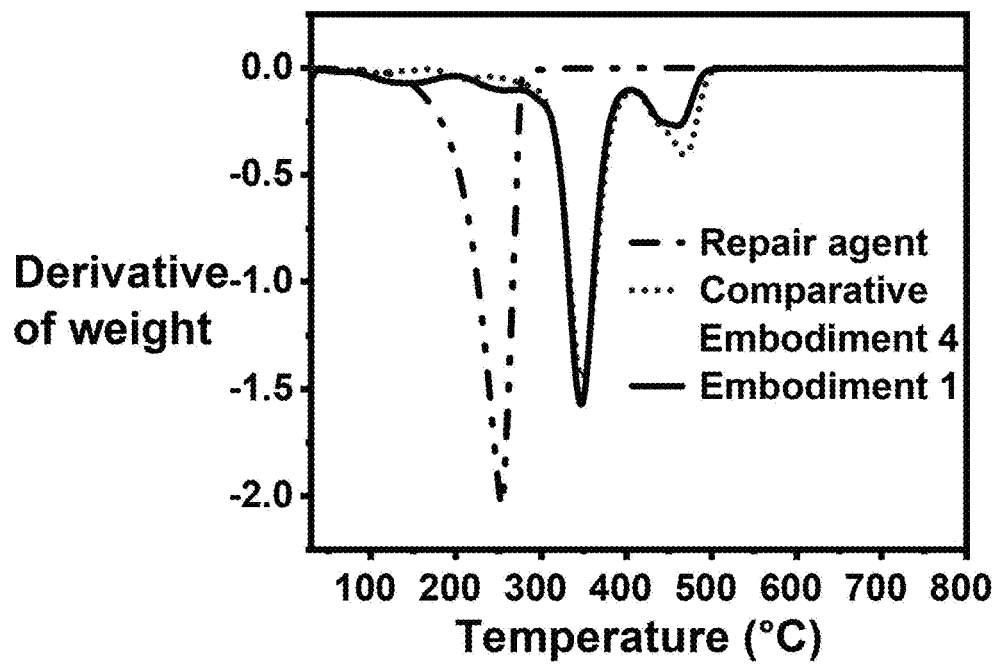
FIG. 3D is a thermal conductivity diagram of the microcapsules prepared in Embodiment 1.

FIG. 2 is a scanning electron microscope image of microcapsules prepared in Embodiment 1. As may be seen from FIG. 2, spherical complete microcapsules with uniform particle size of about 0.95 μm may be obtained according to the method of Embodiment 1.

Embodiment 2

Same as Embodiment 1, except that in step 4), the flow rate of the continuous phase solution is 0.4 mL/min.

Embodiment 3

Same as Embodiment 1, except that in step 4), the flow rate of the continuous phase solution is 0.6 mL/min.

FIG. 3A, FIG. 3B, FIG. 3C and FIG. 3D are thermograms of microcapsules prepared in Embodiments 1-3 and thermal conductivity of Embodiment 1. From FIG. 3A, FIG. 3B, FIG. 3C and FIG. 3D, it may be seen that the coating rate of the repair agent in the microcapsules of Embodiment 1 is the highest, up to 14%, the coating rate of the repair agent in the microcapsules of Embodiment 2 is 9%, the coating rate of the repair agent in the microcapsules of Embodiment 3 is 8%, and it is found that the flow rate is from 0.5 mL/min to 0.6 mL/min, and the coating rate of the repair agent decreases. Therefore, the subsequent experiments of the present disclosure are conducted with the microcapsules prepared in Embodiment 1 as the raw material for the preparation of the coating.

Embodiment 4

It is the same as Embodiment 1, except that in step 5), the microcapsules are mixed with the resin matrix according to the mass ratio of 1:8, and the obtained coating is named MC-11.1.

Embodiment 5

It is the same as Embodiment 1, except that in step 5), the microcapsules are mixed with the resin matrix according to the mass ratio of 1:6, and the obtained coating is named MC-14.3.

Comparative Embodiment 1

It is the same as Embodiment 1, except that the dispersed phase solution in step 1) is prepared by ultrasonically mixing 1 g of 1,3-bis(3-glycidyl propyl)-1,1,3,3-tetramethyldisiloxane, 0.08 g of triarylsulfonium hexafluorophosphate, 0.08 g of rhodamine B and 1 g of tetraethylenepentamine.

Comparative Embodiment 2

It is the same as Embodiment 1, except that the dispersed phase solution in step 1) is prepared by ultrasonically mixing 1.2 g of 1,3-bis(3-glycidyl propyl)-1,1,3,3-tetramethyldisiloxane, 1 g of triarylsulfonium hexafluorophosphate, 1 g of rhodamine B and 1 g of tetraethylenepentamine.

Comparative Embodiment 3

Same as Embodiment 1, except that the repair agent 1,3-bis(3-glycidyl propyl)-1,1,3,3-tetramethyldisiloxane in step 1) is replaced by epoxy resin. It is found that microcapsules could not be successfully formed under this experimental condition.

Comparative Embodiment 4

Step 1) Preparation of dispersed phase solution: 1 g tetraethylenepentamine is taken as dispersed phase solution.
Step 2) is the same as Embodiment 1.
Step 3) is the same as Embodiment 1.
Step 4) Using microfluidic technology, adjusting the flow rate of dispersed phase solution to 0.02 mL/min, and the flow rate of continuous phase solution to 0.5 mL/min, and pump it into PTFE tube 1 and PTFE tube 2 in the microfluidic chip by using injection pump. In the chip, the dispersed phase solution is cut into uniform droplets by the continuous phase solution, the droplets are introduced into the reaction solution which is continuously mechanically stirred at the rotating speed of 100 rpm, tetraethylenepentamine in PTFE tube 1 reacts with isocyanate in the reaction solution, and the interface immediately polymerizes to form a polyurea film. After the chip shearing droplets is finished, the reaction solution is placed in a water bath pot to react at 40° C. for 1 h, at 50° C. for 2 h, and at 60° C. for 2 h, and the rotation speed is kept at 200 rpm, so that the polyurea film grows thicker and becomes polyurea-based microcapsules. The obtained polyurea-based microcapsules are washed with cyclohexane, ultrasonicated for 25 min, centrifuged at 6000 rpm for 5 min, and then naturally dried to obtain microcapsules containing no diagnostic agent and repair agent.

Step 5) Mixing the microcapsules with a resin matrix (which is made of self-drying silicone resin and silane coupling agent in a mass ratio of 20:1) in a mass ratio of 1:7 to obtain a blank coating material based on microfluidic technology without the diagnostic agent and repair agent.

Step 6) Coating the coating material based on microfluidic technology and containing no repair agent microcapsules on a glass slide, and curing at 75° C. for more than 24 h to obtain a blank coating based on microfluidic technology and containing no diagnostic agent and repair agent, named BS-12.5.

Comparative Embodiment 5

Same as Embodiment 3, except that the flow rate of the continuous phase solution in step 4) is 0.2 mL/min.

Performance Test

Figure 4A:
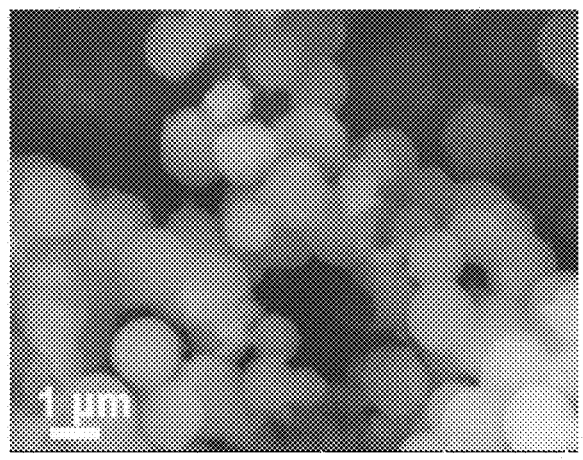
FIG. 4A is a scanning electron microscope image of microcapsules of Comparative Embodiment 4.
Figure 4B:
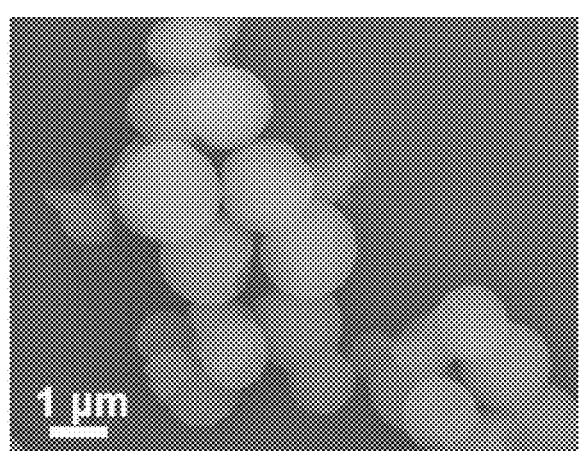
FIG. 4B is a scanning electron microscope image of microcapsules of Comparative Embodiment 1.
Figure 4C:
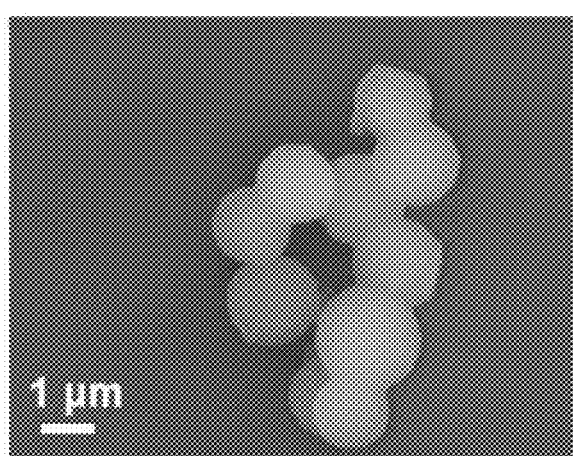
FIG. 4C is a scanning electron microscope image of microcapsules of Comparative Embodiment 2.
Figure 4D:
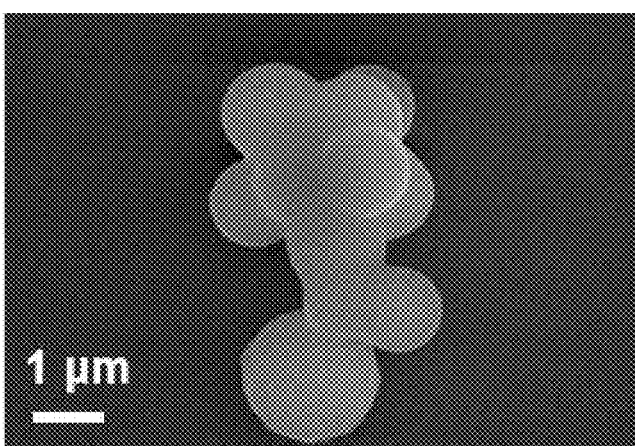
FIG. 4D is a scanning electron microscope image of microcapsules of Comparative Embodiment 5.
Figure 4E:
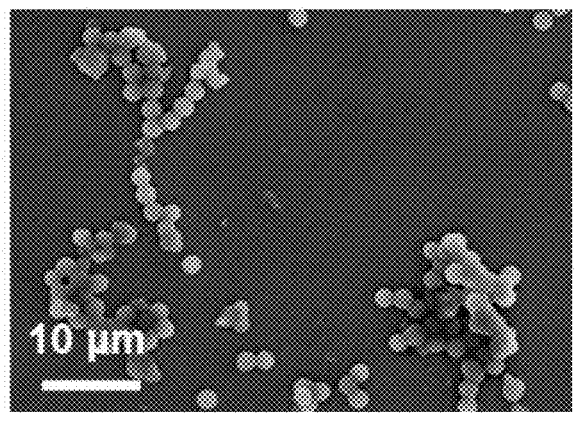
FIG. 4E is a scanning electron microscope image of microcapsules of Embodiment 2.
Figure 4F:
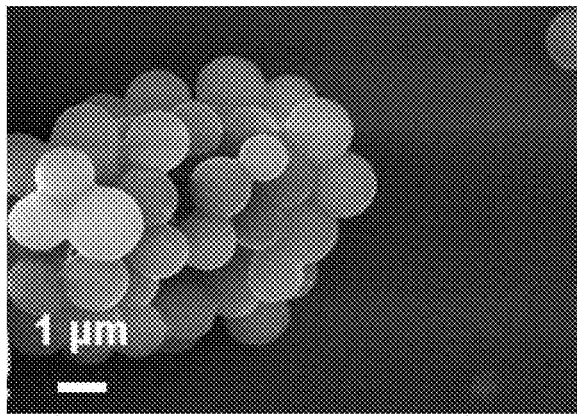
FIG. 4F is a scanning electron microscope image of microcapsules of Embodiment 3.

As may be seen from FIG. 4E and FIG. 4F, spherical complete microcapsules with uniform particle size of about 0.95 μm may be obtained according to the methods of Embodiment 2 and Embodiment 3. According to FIG. 4A, FIG. 4B, FIG. 4C and FIG. 4D, it may be seen that the size of microcapsules prepared according to Comparative Embodiment 4, Comparative Embodiment 1, Comparative Embodiment 2 and Comparative Embodiment 5 are all about 0.95 μm, and the agglomeration phenomenon of microcapsules in Comparative Embodiment 4 is obvious.

Figure 5A:
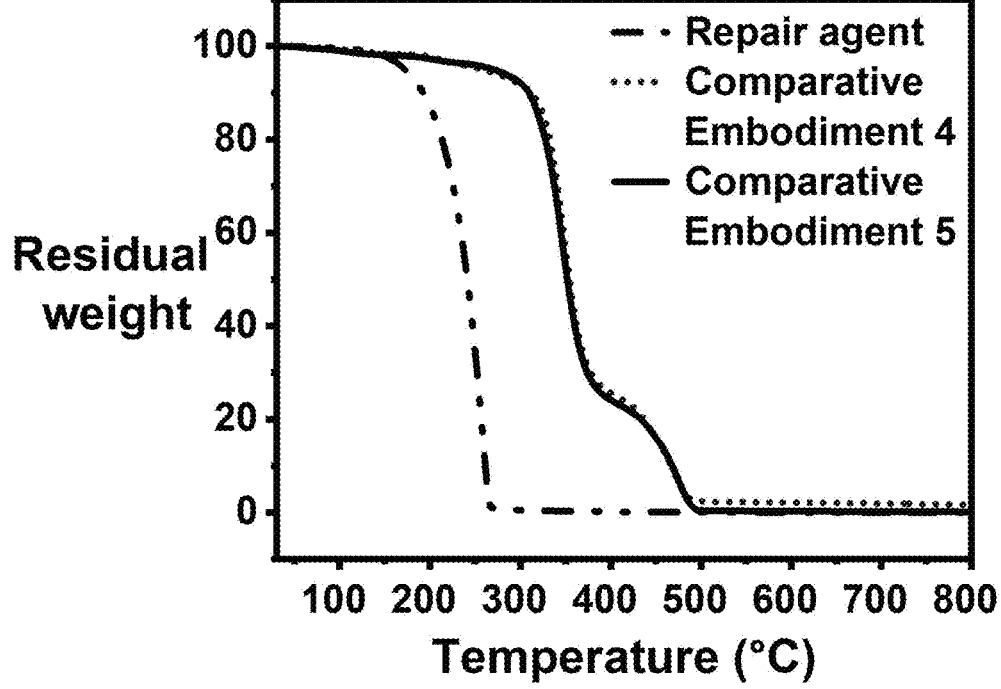
FIG. 5A is a thermogram of microcapsules of Comparative Embodiment 5.
Figure 5B:
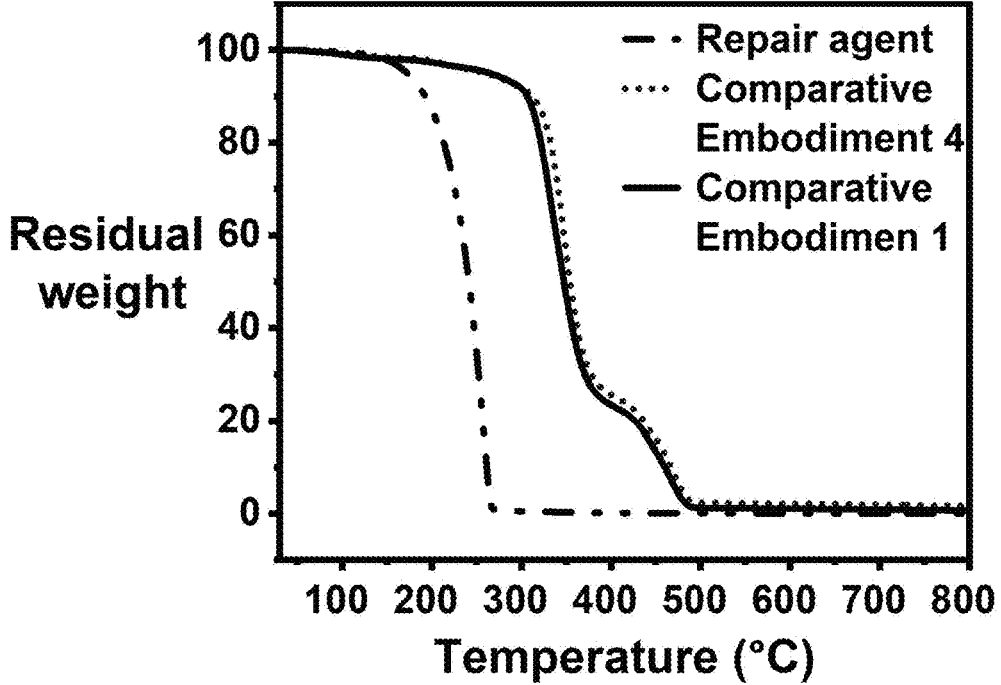
FIG. 5B is a thermogram of microcapsules of Comparative Embodiment 1.
Figure 5C:
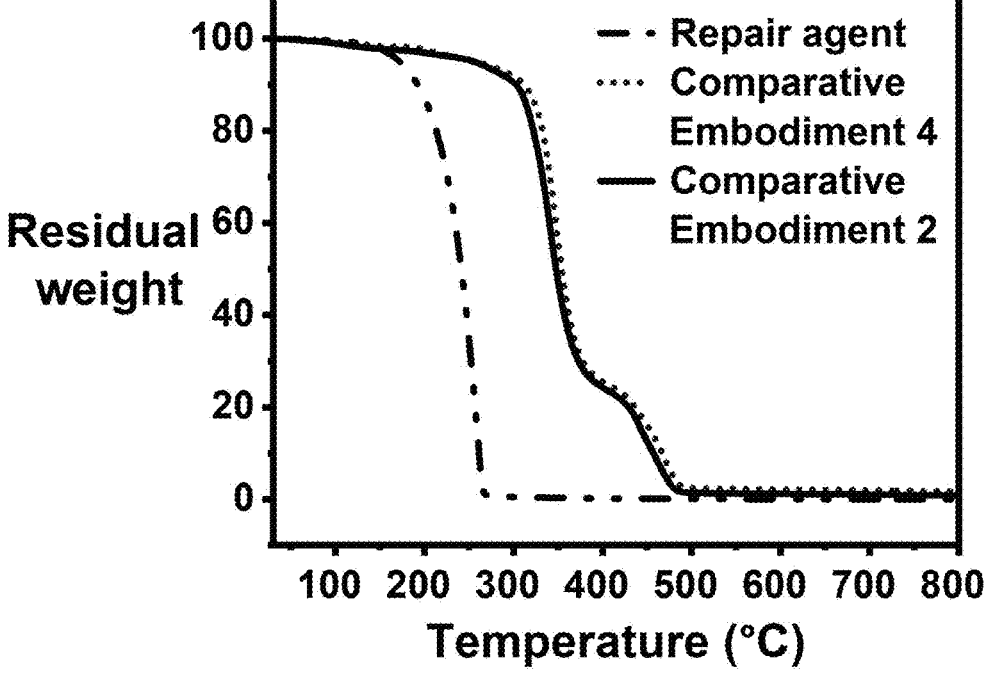
FIG. 5C is a thermogram of microcapsules of Comparative Embodiment 2.
Figure 6A:
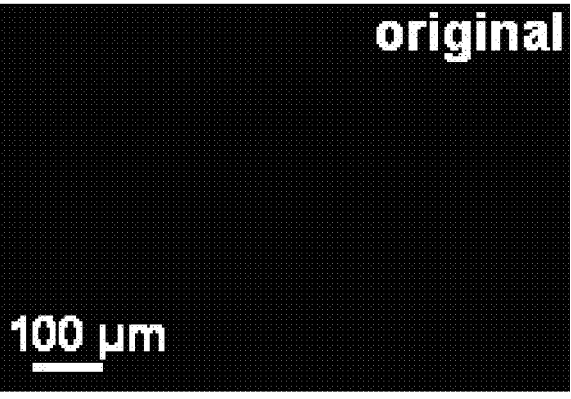
FIG. 6A is a fluorescence microscope image of a blank control group before and after microcracking of the coating in Embodiment 1.
Figure 6B:
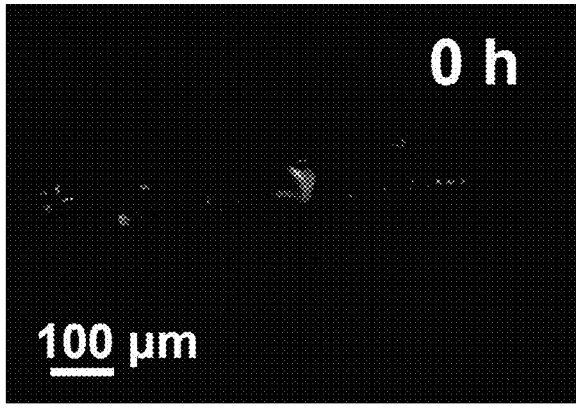
FIG. 6B is a fluorescence microscope image of ultraviolet irradiation for 0 h before and after microcracking of the coating in Embodiment 1.
Figure 6C:
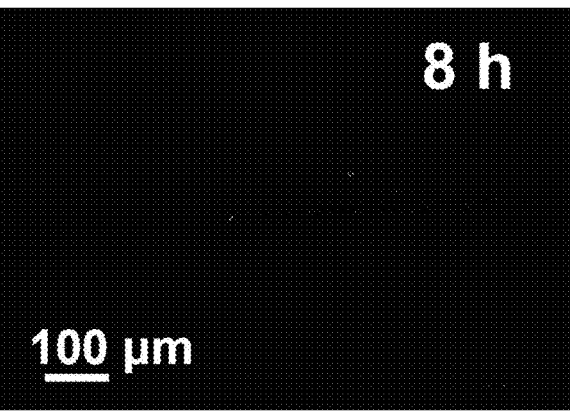
FIG. 6C is a fluorescence microscope image of ultraviolet irradiation for 8 h before and after microcracking of the coating in Embodiment 1.
Figure 6D:
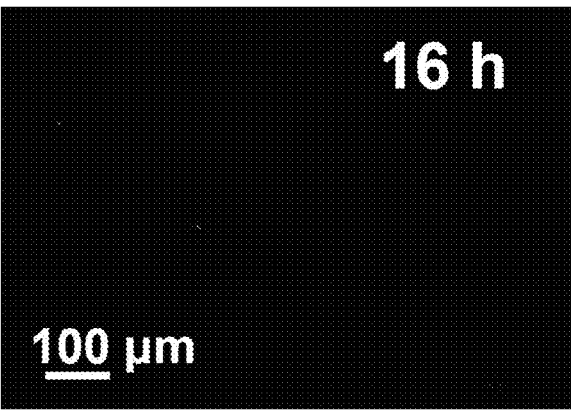
FIG. 6D is a fluorescence microscope image of ultraviolet irradiation for 16 h before and after microcracking of the coating in Embodiment 1.
Figure 6E:
FIG. 6E is a fluorescence microscope image of ultraviolet irradiation for 24 h before and after microcracking of the coating in Embodiment 1.
Figure 6F:
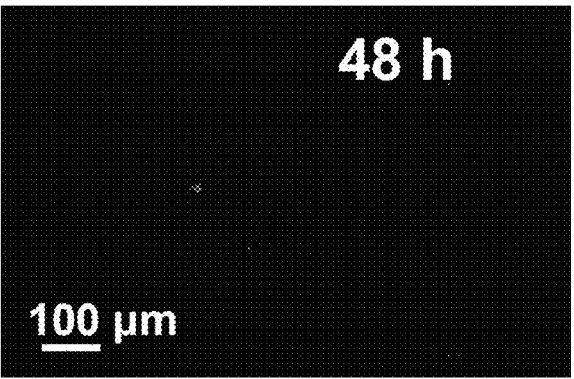
FIG. 6F is a fluorescence microscope image of ultraviolet irradiation for 48 h before and after microcracking of the coating in Embodiment 1.

As may be seen from FIG. 5A, the coating rate of repair agent in microcapsules prepared according to the method of Comparative Embodiment 5 is almost zero. As may be seen from FIG. 5B, the microcapsules prepared according to the method of Comparative Embodiment 1 are not successfully coated with the repair agent. As may be seen from FIG. 5C, the microcapsules prepared according to the method of Comparative Embodiment 2 are not successfully coated with the repair agent.

At the same time, it is also found that there is no repair agent in the microcapsules prepared according to the method of Comparative Embodiment 4.

FIG. 6A, FIG. 6B, FIG. 6C, FIG. 6D, FIG. 6E and FIG. 6F are fluorescence microscope images of the coating before and after microcracking (0 h, 8 h, 16 h, 24 h and 48 h) in Embodiment 1. As may be seen from the figures, the coating is complete and has no fluorescence. When microcracks appear in the coating, the fluorescence effect at the microcracks is the strongest. With the increase of ultraviolet irradiation time, the fluorescence effect begins to weaken gradually, indicating that the repair agent in the coating gradually plays a self-repairing role and the fluorescent agent is degraded under ultraviolet irradiation.

Figure 7A:
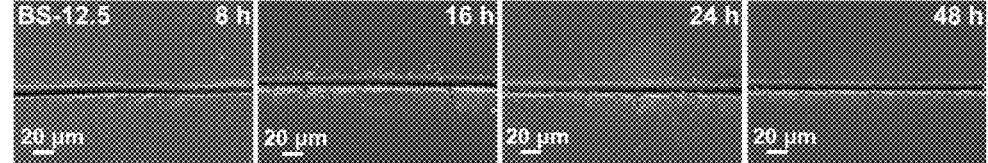
FIG. 7A is the morphology of the coating microcrack repair process of Comparative Embodiment 4.
Figure 7B:
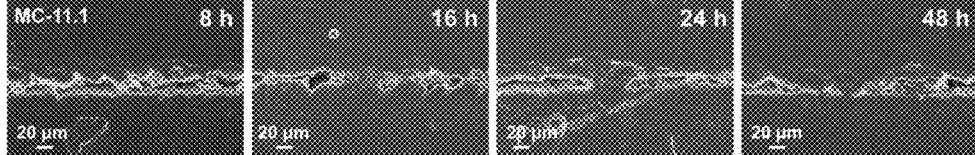
FIG. 7B is the morphology of the coating microcrack repair process of Embodiment 4.
Figure 7C:
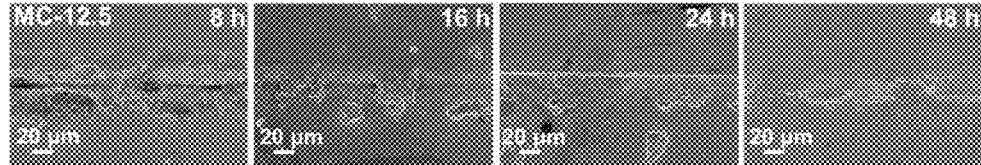
FIG. 7C is the morphology of the coating microcrack repair process of Embodiment 1.
Figure 7D:
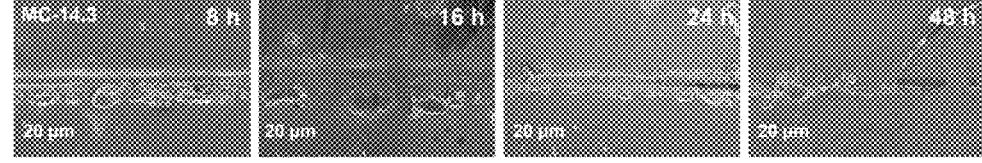
FIG. 7D is the morphology of the coating microcrack repair process of Embodiment 5.

FIG. 7A, FIG. 7B, FIG. 7C and FIG. 7D are the morphologies of coating microcrack repair processes (8 h, 16 h, 24 h, 48 h) in Embodiment 1, Embodiment 4, Embodiment 5 and Comparative Embodiment 4. FIG. 7A is made of microcapsules without repair agent and resin matrix in Comparative Embodiment 4 according to the mass ratio of 1:7. From the figure, it may be seen that the crack morphology of the coating without repairing agent in Comparative Embodiment 4 has hardly changed after 48 h, indicating that the coating in Comparative Embodiment 4 has no self-repairing function. FIG. 7B, FIG. 7C, and FIG. 7D are samples made of microcapsules prepared in Embodiment 4, Embodiment 1, and Embodiment 5 and resin matrix in mass ratios of 1:8, 1:7, and 1:6, respectively. It may be seen that the repairing agent is added in Embodiment 4, Embodiment 1 and Embodiment 5. After the cracks appears, the repairing agent begins to play a role. With the extension of ultraviolet irradiation time, the cracks gradually become smaller until they almost disappear, which further proves the change in FIG. 6A, FIG. 6B, FIG. 6C, FIG. 6D, FIG. 6E and FIG. 6F. As may be seen from FIG. 7B and FIG. 7C, with the increase of microcapsules, the repair effect gradually increases. The content of microcapsules in FIG. 7D is the highest, and the repair effect is slightly lower than that in FIG. 7C due to the uneven dispersion of microcapsules in the resin matrix.

The above is only a preferred embodiment of this disclosure, but the protection scope of this disclosure is not limited to this. Any change or substitution that may be easily thought of by any person familiar with the technical field within the technical scope disclosed in this disclosure should be covered by the protection scope of this disclosure. Therefore, the protection scope of this disclosure should be based on the protection scope of the claims.

What is claimed is:

1. A self-diagnosis and self-repair intelligent coating based on microfluidic technology, wherein the coating is made from a composition comprising microcapsules and a resin matrix;

the microcapsules consist of a shell material and coating materials;

the shell material is polyurea;

the coating materials are a repair agent, a diagnostic agent and a photoinitiator;

the repair agent is 1,3-bis (3-glycidyl propyl)-1,1,3,3-tetramethyldisiloxane;

the diagnostic agent is rhodamine B;

the photoinitiator is triarylsulfonium hexafluorophosphate; and the resin matrix is a mixture of self-drying silicone resin and silane coupling agent with a mass ratio of 20:1; and a mass content of the microcapsules in the composition is 11.1-14.3%.

2. A preparation method of the self-diagnosis and self-repair intelligent coating based on the microfluidic technology according to claim 1, the preparation method comprising:

using the microfluidic technology, pumping a dispersed phase solution and a continuous phase solution into polytetrafluoroethylene tube 1 and polytetrafluoroethylene tube 2 in a microfluidic chip respectively; in the chip, cutting the dispersed phase solution into uniform droplets with the continuous phase solution, and introducing the droplets into a reaction solution with continuous mechanical stirring to form a polyurea film, and after the chip cutting the droplets is finished, placing the reaction solution in a water bath pot and continuously heating and stirring, wherein the polyurea film grows thicker and becomes polyurea-based microcapsules; and washing the obtained polyurea-based microcapsules with cyclohexane, sonicating, centrifuging, and then naturally drying to obtain the microcapsules;

mixing the microcapsules with the resin matrix to obtain a self-diagnosis and self-repair intelligent coating material based on the microfluidic technology; and coating the self-diagnosis and self-repair intelligent coating material based on the microfluidic technology on a glass slide and curing to obtain the self-diagnosis and self-repair intelligent coating based on the microfluidic technology, wherein a method for preparing the dispersed phase solution comprises: ultrasonically mixing the 1,3-bis (3-glycidyl propyl)-1,1,3,3-tetramethyldisiloxane, the triarylsulfonium hexafluorophosphate, the rhodamine B and tetraethylenepentamine, wherein a method for preparing the continuous phase solution comprises: ultrasonically mixing an n-hexadecane solution and polyethylene glycol dimeric hydroxy stearate, wherein a method for preparing the reaction solution comprises: ultrasonically mixing 4,4-dicyclohexylmethane diisocyanate, decalin, polyethylene glycol dimeric hydroxy stearate and triethylenediamine.

3. The preparation method according to claim 2, wherein a mass ratio of the 1,3-bis (3-glycidyl propyl)-1,1,3,3-tetramethyldisiloxane, the triarylsulfonium hexafluorophosphate, the rhodamine B and the tetraethylenepentamine is 1.1:0.09:0.09:1.

4. The preparation method according to claim 2, wherein a mass ratio of the n-hexadecane solution to the polyethylene glycol dimeric hydroxy stearate in the method for preparing the continuous phase solution is 2.784:0.027.

5. The preparation method according to claim 2, wherein a mass ratio of the 4,4-dicyclohexylmethane diisocyanate, the decalin, the polyethylene glycol dimeric hydroxy stearate and the triethylenediamine in the method for preparing the reaction solution is 9:67.2:0.75:0.75.

6. The preparation method according to claim 2, wherein a flow rate of the dispersed phase solution is 0.02 mL/min, and a flow rate of the continuous phase solution is 0.4-0.6 mL/min.

7. The preparation method according to claim 2, wherein a speed of the mechanical stirring is 100 rpm; and parameters of the heating and stirring are: a temperature of 40-60° C., a duration of 1-2 h, and a stirring speed of 200 rpm.

* * * * *